(12) United States Patent
Chang

(10) Patent No.: US 10,220,260 B2
(45) Date of Patent: Mar. 5, 2019

(54) RESISTANCE SENSING MECHANISM FOR EXERCISE EQUIPMENT

(71) Applicant: Rexon Industrial Corp., Ltd., Taichung (TW)

(72) Inventor: Yao-Jen Chang, Taichung (TW)

(73) Assignee: REXON INDUSTRIAL CORP., LTD., Taichung (TW)

( * ) Notice: Subject to any disclaimer, the term of this patent is extended or adjusted under 35 U.S.C. 154(b) by 5 days.

(21) Appl. No.: 15/498,583

(22) Filed: Apr. 27, 2017

(65) Prior Publication Data

US 2017/0312580 A1 Nov. 2, 2017

(30) Foreign Application Priority Data

Apr. 29, 2016 (TW) .............................. 105113436 A

(51) Int. Cl.
*A63B 21/22* (2006.01)
*A63B 22/06* (2006.01)
(Continued)

(52) U.S. Cl.
CPC ...... *A63B 24/0087* (2013.01); *A63B 21/0051* (2013.01); *A63B 21/00069* (2013.01);
(Continued)

(58) Field of Classification Search
CPC ............ A63B 21/00192; A63B 21/005; A63B 21/0051; A63B 21/0052; A63B 21/0056; A63B 21/22; A63B 21/225; A63B 21/4045; A63B 21/4047; A63B 21/4049; A63B 22/0046; A63B 22/06; A63B 22/0605; A63B 2022/0635; A63B 24/0087; A63B 69/16; A63B 2069/168; A63B 71/0054; A63B 2071/0063; A63B 2071/0072; A63B 2071/0081; A63B 2071/009; A63B 2209/00; A63B 2209/08; A63B 2220/80; A63B 2220/801; A63B 2220/803;
(Continued)

(56) References Cited

U.S. PATENT DOCUMENTS 4,007,927 A * 2/1977 Proctor ................ A63B 21/015
482/63
6,485,397 B1 * 11/2002 Manderbacka .... A63B 21/0051
482/57
(Continued)

*Primary Examiner* — Gary D Urbiel Goldner
(74) *Attorney, Agent, or Firm* — Bacon & Thomas, PLLC

(57) ABSTRACT

A resistance sensing mechanism including a resistance adjusting unit including a holder frame, a locating sleeve disposed above the holder frame, an adjustment screw rod rotatably inserted through the locating sleeve and a screw nut threaded onto the adjustment screw rod and pivotally connected to the holder frame, and a sensor unit including a first linkage pivotally connected with one end to the screw nut, a second linkage having one end pivotally connected to an opposite end of the first linkage and an opposite end pivotally connected to the locating sleeve, a sensor mounted at one of the first and second linkages and a sensible member mounted at the other of the first and second linkages to face toward the sensor. Subject to the linkage relationship between the first and second linkages, the distance between the sensor and the sensible member can be changed, thereby generating a relative sensing signal.

5 Claims, 3 Drawing Sheets

(51) Int. Cl.
  *A63B 24/00* (2006.01)
  *G01D 5/14* (2006.01)
  *G01L 1/12* (2006.01)
  *A63B 71/06* (2006.01)
  *A63B 21/005* (2006.01)
  *G01L 3/22* (2006.01)
  *A63B 21/00* (2006.01)

(52) U.S. Cl.
  CPC ........ *A63B 21/225* (2013.01); *A63B 22/0605* (2013.01); *A63B 71/0622* (2013.01); *G01D 5/145* (2013.01); *G01L 1/12* (2013.01); *G01L 3/22* (2013.01); *A63B 2220/20* (2013.01); *A63B 2220/80* (2013.01)

(58) Field of Classification Search
  CPC .......... A63B 2220/805; A63B 2220/83; A63B 2220/833; A63B 2225/09; A63B 2225/093
  See application file for complete search history.

(56) References Cited

U.S. PATENT DOCUMENTS

| | | | | |
|---|---|---|---|---|
| 7,585,258 B2* | 9/2009 | Watson | .................. | A63B 24/00 188/159 |
| 7,785,236 B1* | 8/2010 | Lo | ..................... | A63B 21/0051 482/57 |
| 8,052,581 B1* | 11/2011 | Lohr | .................... | A63B 21/015 482/63 |
| 8,316,709 B2* | 11/2012 | Grab | .................. | A63B 22/0605 73/379.01 |
| 8,641,581 B2* | 2/2014 | Bacanovic | ......... | A63B 22/0605 482/57 |
| 8,950,276 B2 | 2/2015 | Wu | | |
| 9,314,667 B2* | 4/2016 | Puerschel | .......... | A63B 24/0087 |
| 9,468,794 B2* | 10/2016 | Barton | ................ | A63B 71/0622 |
| 9,616,276 B2* | 4/2017 | Dalebout | ............. | A63B 21/225 |
| 9,839,807 B2* | 12/2017 | Golesh | .............. | A63B 22/0605 |
| 2006/0160669 A1* | 7/2006 | Lizarralde | .......... | A63B 21/0051 482/63 |
| 2008/0096725 A1* | 4/2008 | Keiser | ................ | A63B 21/0051 482/8 |
| 2010/0234185 A1* | 9/2010 | Watt | .................... | A63B 21/0051 482/8 |
| 2011/0048141 A1* | 3/2011 | Svenberg | ............. | A63B 21/015 73/862.191 |
| 2012/0088637 A1* | 4/2012 | Lull | ..................... | A63B 21/015 482/57 |
| 2012/0088638 A1* | 4/2012 | Lull | ..................... | A63B 21/015 482/57 |
| 2017/0106222 A1* | 4/2017 | Mayer | ................ | A63B 21/0051 |
| 2017/0304667 A1* | 10/2017 | Chou | ................. | A63B 21/0056 |
| 2017/0312581 A1* | 11/2017 | Chang | ................ | A63B 21/225 |
| 2017/0319906 A1* | 11/2017 | Chang | ................ | A63B 21/225 |

* cited by examiner

RESISTANCE SENSING MECHANISM FOR EXERCISE EQUIPMENT

BACKGROUND OF THE INVENTION

Field of the Invention

The present invention relates to exercise equipment technology and more particularly, to a resistance sensing mechanism for use in an exercise equipment.

Description of the Related Art

In order to allow the user to easily adjust the operation of an exercise machine according to personal training needs, the exercise equipment is generally equipped with a damping resistance adjuster. Through the damping resistance adjuster, the user can adjust the damping resistance to the flywheel or other similar elements. Further, in order to allow the user to accurately control the resistance given by the damping resistance adjuster during the adjustment operation, some exercise equipments may be configured to provide a sensing mechanism for sensing the degree of resistance given by the damping resistance adjuster. Subject to the detection of the sensing mechanism, the user can adjust the damping resistance at the appropriate time.

In the prior art relating to the sensing mechanism, Taiwan Patent No. M435942 discloses a torque sensing mechanism that includes a main sensor and a sensible member respectively provided on a locating member and a position adjusting member, and an adjustment screw rod rotatable to change the relative distance between the locating member and the position adjusting adjustment, causing a change in the distance between the main sensor and the sensible member and further generation of a corresponding sensing signal indicative of such a distance change. However, according to this prior art patent design, the main sensor is movable but the sensible member is immovable, thus, it takes too much time to achieve one detection operation. So, in actual operation, it is likely the detection of the resistance causes inconvenience to the user.

SUMMARY OF THE INVENTION

The present invention has been developed in view of the above identified circumstances. It is one of the main objects of the present invention to provide a resistance sensing mechanism for exercise equipment, which can effectively reduce the itinerary of action and shorten the sensing time, thereby increasing the ease of operation.

To achieve this and other objects of the present invention, a resistance sensing mechanism comprises a resistance adjusting unit and a sensor unit. The resistance adjusting unit comprises a holder frame, a locating sleeve, an adjustment screw rod and a screw nut. The holder frame is disposed around an outer perimeter of a flywheel. The locating sleeve is disposed above the holder frame. The adjustment screw rod has a threaded shank axially inserted through the locating sleeve and rotatable in situ relative to the locating sleeve. The screw nut is threaded onto the threaded shank of the adjustment screw rod. The sensor unit comprises a first linkage, a second linkage, a sensor and a sensible member. The first linkage has one end thereof pivotally connected with one end of the second linkage, and an opposite end thereof pivotally connected to the screw nut of the resistance adjusting unit. The second linkage has an opposite end thereof pivotally connected to the locating sleeve of the resistance adjusting unit. The sensor is mounted at one of the first linkage and the second linkage. The sensible member is mounted at the other of the first linkage and the second linkage to face toward the sensor. Subject to the linkage relationship between the first and second linkages, the distance between the sensor and the sensible member can be changed, thereby generating a relative sensing signal.

As can be seen from the above, the resistance sensing mechanism utilizes the arrangement of the first and second linkages for enabling the sensor and the sensible member to be moved toward or away from each other upon a resistance change, and thus, the present invention can effectively achieve the effects of reducing the itinerary of the action and shortening the sensing time.

Other advantages and features of the present invention will be fully understood by reference to the following specification in conjunction with the accompanying drawings, in which like reference signs denote like components of structure.

DETAILED DESCRIPTION OF THE INVENTION

Figure 1:
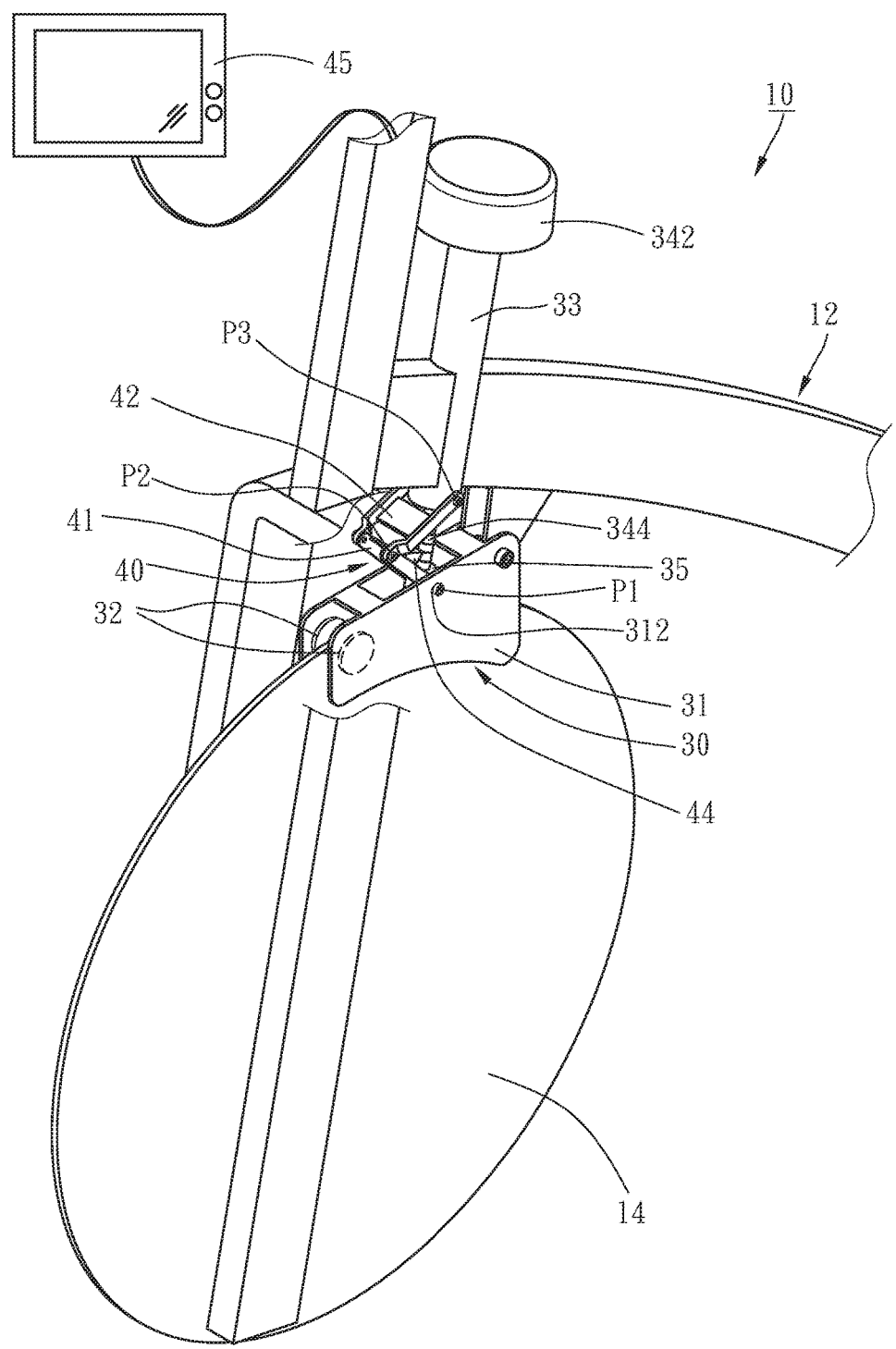
FIG. 1 is an oblique top elevational view of a resistance sensing mechanism used in an exercise equipment in accordance with the present invention.

Referring to FIG. 1, a resistance sensing mechanism 10 for exercise equipment in accordance with the present invention is shown. The exercise equipment comprises a bicycle frame 12 and a flywheel 14 rotatably mounted at the bicycle frame 12. The resistance sensing mechanism 10 comprises a resistance adjusting unit 30 and a sensor unit 40.

The resistance adjusting unit 30 comprises a holder frame 31, two opposing magnetic members 32, a locating sleeve 33, an adjustment screw rod 34, and a screw nut 35. The holder frame 31 is disposed around the outer perimeter of the flywheel 14 and pivotally connected with a rear end thereof to the bicycle frame 12, having two elongated slots 312 respectively cut through two opposite sidewalls thereof. The magnetic members 32 are bilaterally mounted in the holder frame 31 for allowing the flywheel 14 to rotate therebetween. The locating sleeve 33 is affixed to the bicycle frame 12 and disposed above the holder frame 31. The adjustment screw rod 34 comprises a rotary knob 342, and a threaded shank 344 fixedly connected with the rotary knob 342. The threaded shank 344 is inserted through the locating sleeve 33 and can be rotated in situ. The screw nut 35 is threaded onto the threaded shank 344 of the adjustment screw rod 34, having two opposite lateral sides thereof respectively pivotally connected to the holder frame 31 by a respective first pivot pin P1. The first pivot pins P1 are respectively slidably inserted through the respective elongated slots 312 of the holder frame 31.

The sensor unit 40 comprises a first linkage 41 and a second linkage 42. The first linkage 41 has one end thereof pivotally connected to one end of the second linkage 42 by a pair of second pivot pins P2, and an opposite end thereof pivotally connected to the two opposite lateral sides of the screw nut 35 of the resistance adjusting unit 30 by the aforesaid first pivot pins P1. The second linkage 42 has an opposite end thereof pivotally connected to the locating sleeve 33 by a pair of third pivot pins P3. The sensor unit 40 further comprises a sensor 43 and a sensible member 44. The sensor 43 can be, for example, a Hall sensor selectively mounted at a top side of the first linkage 41 or a bottom side of the second linkage 42, and the sensible member 44, which can be, for example, a magnet, is selectively mounted at the bottom side of the second linkage 42 or the top side of the first linkage 41 to face toward the sensor 43. If the sensor 43 is mounted at the top side of the first linkage 41, the sensible member 44 should be mounted at the bottom side of the second linkage 42. On the contrary, if the sensor 43 is mounted at the bottom side of the second linkage 42, the sensible member 44 should be mounted at the top side of the first linkage 41. In either of the aforesaid two selective mounting arrangements, the sensor 43 and the sensible member 44 must be arranged to face toward each other.

Figure 2:
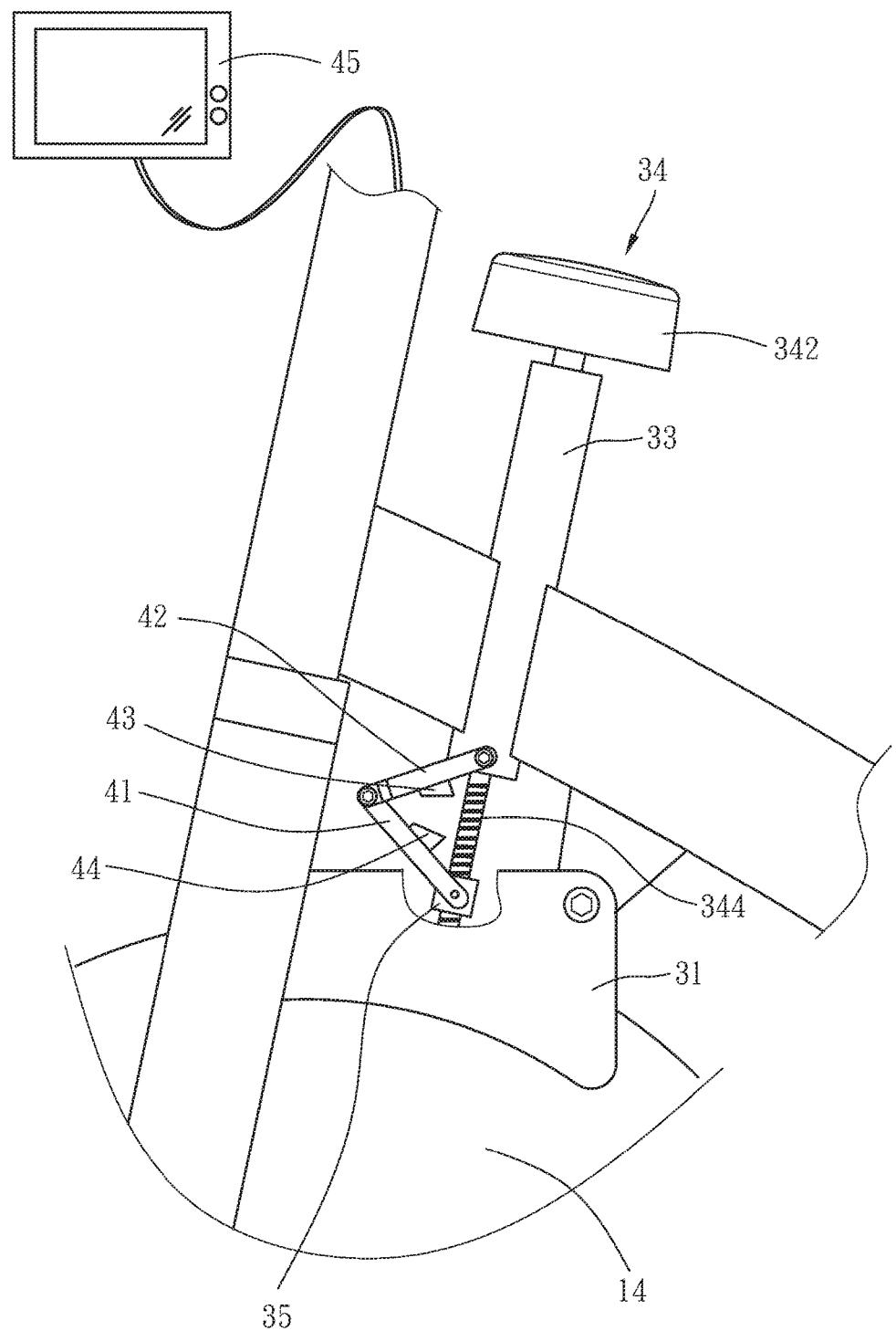
FIG. 2 is a plain view of the preferred embodiment of the present invention, illustrating the sensor and sensible member of the resistance sensing mechanism moved far from each other.
Figure 3:
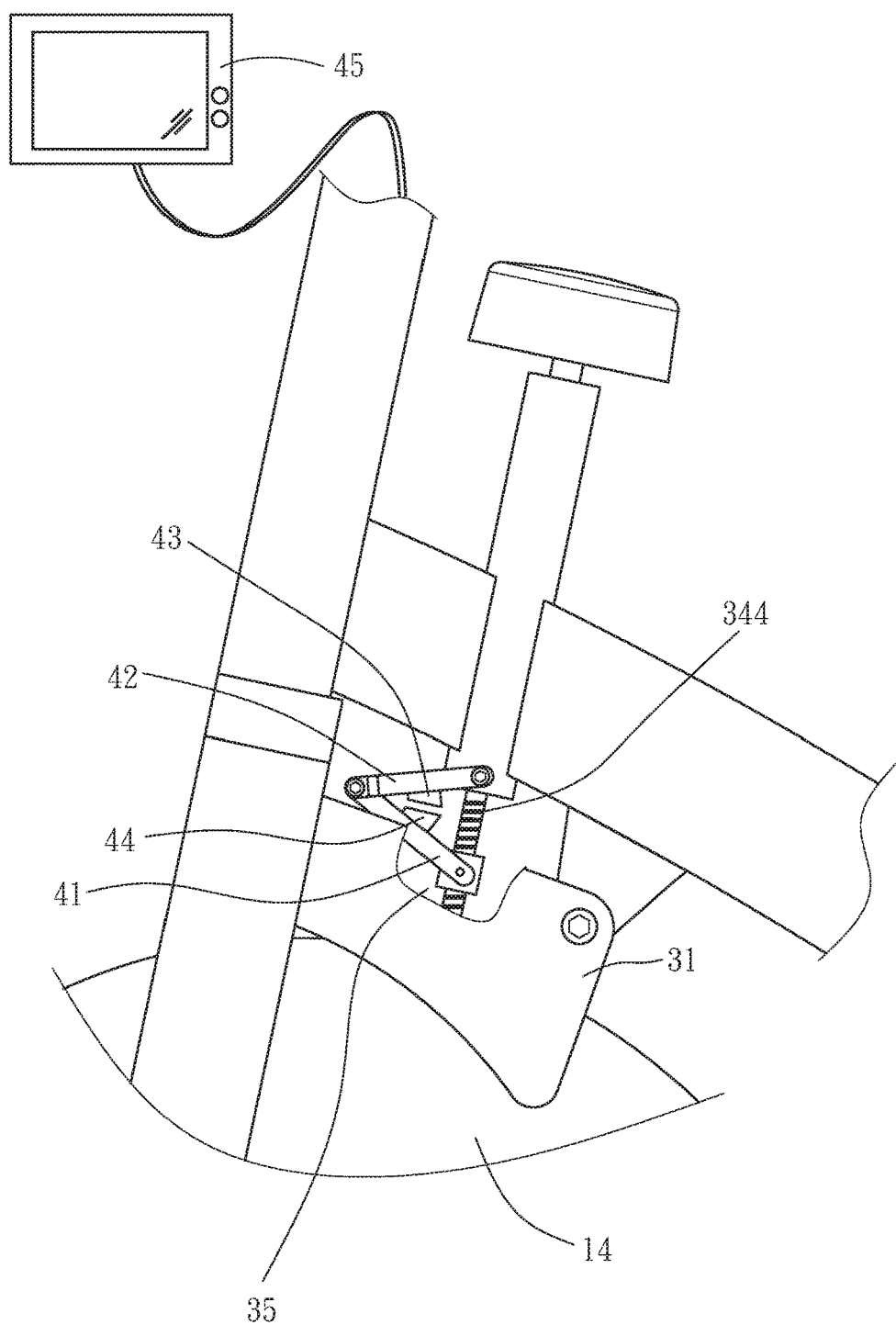
FIG. 3 is similar to FIG. 2, illustrating the sensor and sensible member of the resistance sensing mechanism moved toward each other.

As illustrated in FIGS. 2 and 3, when operating the rotary knob 342 to rotate the adjustment screw rod 34 clockwise or counter-clockwise, the screw nut 35 is forced to move upward or downward along the threaded shank 344 of the adjustment screw rod 34. During displacement of the screw nut 35, the screw nut 35 drives the holder frame 31 to bias relative to the flywheel 14, causing a change in the magnetic flux between the two magnetic members 32 to provide a damping resistance to the flywheel 14. On the other hand, during displacement of the screw nut 35, the screw nut 35 simultaneously forces the first linkage 41 to move relative to the second linkage 42 in direction toward or away from the second linkage 42, and thus the distance between the sensor 43 and the sensible member 44 is relatively changed. Once the distance between the sensor 43 and the sensible member 44 is changed, the sensor 43 provides a relative sensing signal to a control panel 45 so that the user can see the resistance changes based on the message displayed on the control panel 45.

In conclusion, the resistance sensing mechanism 10 utilizes the arrangement of the first and second linkages 41, 42 for enabling the sensor 43 and the sensible member 44 to be moved toward or away from each other upon a resistance change. When compared to prior art techniques of unilateral action, the present invention can effectively achieve the effects of reducing the itinerary of the action and shortening the sensing time.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A resistance sensing mechanism used in an exercise equipment comprising a bicycle frame and a flywheel rotatably mounted at said bicycle frame, the resistance sensing mechanism comprising:
a resistance adjusting unit comprising a holder frame configured to be pivotally connected with one end thereof to said bicycle frame and disposed around an outer perimeter of said flywheel, a locating sleeve configured to be affixed to said bicycle frame and disposed above said holder frame, an adjustment screw rod having a threaded shank axially inserted through said locating sleeve and rotatable in situ relative to said locating sleeve, and a screw nut pivotally mounted and connected to said holder frame and threaded onto said threaded shank of said adjustment screw rod; and
a sensor unit comprising a first linkage, a second linkage, a sensor and a sensed member, said first linkage having one end thereof pivotally connected with one end of said second linkage and an opposite end thereof pivotally connected to said screw nut of said resistance adjusting unit, said second linkage having an opposite end thereof pivotally connected to said locating sleeve of said resistance adjusting unit, said sensor being mounted at one of said first linkage and said second linkage, said sensed member being mounted at the other of said first linkage and said second linkage to face toward said sensor and to be sensed by said sensor.

2. The resistance sensing mechanism as claimed in claim 1, wherein said holder frame comprises two elongated slots respectively and symmetrically located in two opposite lateral sides thereof, and two pivot pins respectively slidably inserted through said two elongated slots to pivotally connect said screw nut to said holder frame.

3. The resistance sensing mechanism as claimed in claim 1, wherein said sensor is mounted at said first linkage and said sensed member is mounted at said second linkage.

4. The resistance sensing mechanism as claimed in claim 1, wherein said sensor is mounted at said second linkage and said sensed member is mounted at said first linkage.

5. The resistance sensing mechanism as claimed in claim 1, wherein said sensor is a Hall sensor and said sensed member is a magnet.

* * * * *